(12) United States Patent
Wan et al.

(10) Patent No.: US 9,585,208 B2
(45) Date of Patent: Feb. 28, 2017

(54) LED POWER CIRCUIT USING DISCRETE COMPONENTS AND CONFIGURATION METHOD

(71) Applicant: ZHEJIANG SHENGHUI LIGHTING CO., LTD, Jiaxing (CN)

(72) Inventors: Yehua Wan, Jiaxing (CN); Changzhou Jin, Jiaxing (CN); Jinxiang Shen, Jiaxing (CN)

(73) Assignee: ZHEJIANG SHENGHUI LIGHTING CO., LTD, Jiaxing (CN)

( * ) Notice: Subject to any disclaimer, the term of this patent is extended or adjusted under 35 U.S.C. 154(b) by 100 days.

(21) Appl. No.: 14/421,349

(22) PCT Filed: Oct. 17, 2014

(86) PCT No.: PCT/CN2014/088802
§ 371 (c)(1),
(2) Date: Feb. 12, 2015

(87) PCT Pub. No.: WO2015/135319
PCT Pub. Date: Sep. 17, 2015

(65) Prior Publication Data
US 2016/0249419 A1      Aug. 25, 2016

(30) Foreign Application Priority Data

Mar. 14, 2014   (CN) .......................... 2014 1 0096992

(51) Int. Cl.
*H05B 37/02* (2006.01)
*H05B 33/08* (2006.01)

(52) U.S. Cl.
CPC ..... *H05B 33/0812* (2013.01); *H05B 33/0815* (2013.01); *H05B 33/0845* (2013.01); *Y02B 20/346* (2013.01)

(58) Field of Classification Search
CPC ............ H05B 33/0815; H05B 33/0845; H05B 33/0854; H05B 37/02; H05B 39/04; H05B 41/36
(Continued)

(56) References Cited

U.S. PATENT DOCUMENTS 8,941,328 B2 * 1/2015 Wu ..................... H05B 33/0812
                                                          315/297
9,301,349 B2 * 3/2016 Zhu ..................... H05B 33/0851
(Continued)

FOREIGN PATENT DOCUMENTS

| CN | 202857066 U | 4/2013 |
| CN | 103269553 A | 8/2013 |

(Continued)

*Primary Examiner* — Tung X Le
(74) *Attorney, Agent, or Firm* — Anova Law Group, PLLC

(57) ABSTRACT

A power circuit for an LED lighting device using discrete components is provided. The power circuit includes a filtering unit configured to filter an inputted AC and a rectifying unit configured to convert an AC to a DC. The power circuit also includes a transformer connected to the rectifying unit. Further, the power circuit includes a first switch and a second switch that are field effect transistors, wherein a grid electrode of the first switch is connected to a drain electrode of the second switch. Further, a drain electrode of the first switch is connected to the transformer. A source electrode of the first switch is connected to a source electrode of the second switch through a detection resistor. A grid electrode of the second switch is connected to the source electrode of the first switch through a thermistor.

20 Claims, 2 Drawing Sheets

(58) Field of Classification Search
USPC ................ 315/219, 224, 274, 294, 307, 308
See application file for complete search history.

(56) References Cited

U.S. PATENT DOCUMENTS

| | | | | |
|---|---|---|---|---|
| 2011/0266969 A1* | 11/2011 | Ludorf | ................ | H02M 1/4258 315/294 |
| 2011/0309759 A1* | 12/2011 | Shteynberg | ........ | H05B 33/0815 315/201 |
| 2012/0019714 A1* | 1/2012 | Hiramatu | ........... | H05B 33/0815 348/370 |
| 2012/0200229 A1* | 8/2012 | Kunst | ................ | H05B 33/0815 315/186 |
| 2014/0252989 A1* | 9/2014 | Knoedgen | ......... | H02M 3/33507 315/307 |

FOREIGN PATENT DOCUMENTS

| | | |
|---|---|---|
| CN | 103619094 A | 3/2014 |
| CN | 103889116 A | 6/2014 |
| CN | 203840591 U | 9/2014 |

* cited by examiner

US 9,585,208 B2

LED POWER CIRCUIT USING DISCRETE COMPONENTS AND CONFIGURATION METHOD

CROSS-REFERENCES TO RELATED APPLICATIONS

This PCT application claims priority to Chinese Patent Application No. 201410096992.2, filed on Mar. 14, 2014, the entire content of which is incorporated herein by reference.

FIELD OF THE INVENTION

The present disclosure generally relates to the field of light emitting diode (LED) lighting technology and, more particularly, relates to a power circuit for an LED lighting device using discrete components and a method for configuring the power circuit.

BACKGROUND

LED lighting may generally provide advantages in energy conservation, environmental protection, controllable lighting, solid state lighting, and long operational lifetime. LED lamps thus have been widely used in various areas for public, commercial, and/or indoor lightings.

Often, LED lamps may have lamp-head structures designed similar to incandescent lamps, energy saving lamps, and other conventional lamps. Presumably, LED lamps may be used to replace other conventional lamps by an easy installation without changing original structures of a lighting system including other conventional lamps. However, existing LED power and control circuits are integrated circuits and the structures are very complicated. For the LED power and control circuits formed by discrete components, a master switch often may be a triode. The control device of the master switch may also be a triode. In general, the working temperature of the LED lamps is relatively high. Therefore, the disadvantages of this control mode may include large temperature drifts, unstable output electrical currents of the LED, and low efficiencies.

The disclosed LED power circuit using discrete components and configuration methods are directed to solve one or more problems set forth above and other problems.

BRIEF SUMMARY OF THE DISCLOSURE

One aspect of the present disclosure provides a power circuit for an LED lighting device using discrete components. The LED power circuit includes a filtering unit configured to filter an inputted alternating current (AC) and a rectifying unit configured to convert the AC to a direct current (DC). The LED power circuit also includes a transformer connected to the rectifying unit. Further, the LED power circuit includes a first switch including a grid electrode, a drain electrode, and a source electrode and a second switch including a grid electrode, a drain electrode, and a source electrode, wherein the first switch and the second switch are field effect transistors. The grid electrode of the first switch is connected to the drain electrode of the second switch. The drain electrode of the first switch is connected to the transformer. The source electrode of the first switch is connected to the source electrode of the second switch through a detection resistor. The grid electrode of the second switch is connected to the source electrode of the first switch through a thermistor.

Another aspect of the present disclosure provides a method for configuring a power circuit for an LED lighting device using discrete components. The method includes configuring a filtering unit to filter an inputted AC. The method also includes connecting a transformer to a rectifying unit, where the rectifying unit is configured to convert the AC to a DC. The method also includes configuring a first switch including a grid electrode, a drain electrode and a source electrode and a second switch including a grid electrode, a drain electrode and a source electrode, wherein the first switch and the second switch are field effect transistors. The grid electrode of the first switch is connected to the drain electrode of the second switch. The drain electrode of the first switch is connected to the transformer. The source electrode of the first switch is connected to the source electrode of the second switch through a detection resistor. The grid electrode of the second switch is connected to the source electrode of the first switch through a thermistor.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts.

Figure 1:
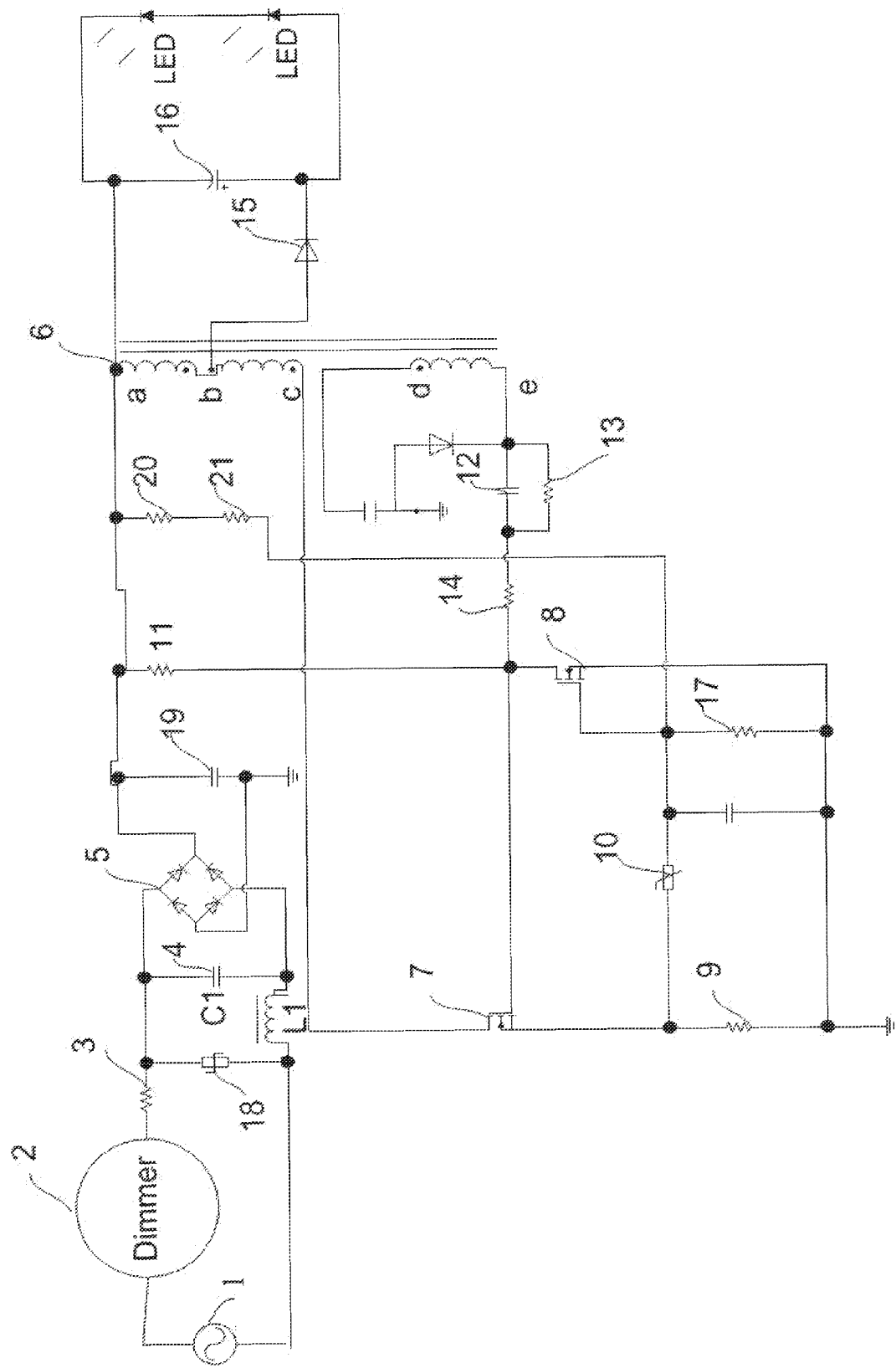
FIG. 1 illustrates a structure diagram of an exemplary LED power circuit consistent with the disclosed embodiments.

FIG. 1 illustrates a structure diagram of an exemplary LED power circuit consistent with the disclosed embodiments. The LED power circuit is a buck-boost circuit herein. As shown in FIG. 1, the LED power circuit can be used to drive an LED lighting device. An AC power supply 1 and a dimmer 2 can be existing structures that are widely used. The LED power circuit may include a filtering unit 4, a rectifying unit 5, a transformer 6, a first switch 7, and a second switch 8.

The transformer 6 includes a main coil a-c that is connected to the rectifying unit 5, an output coil a-b and an auxiliary coil d-e that are connected to the LED lighting device. The first switch 7 is an N-type field effect transistor and includes a grid electrode, a drain electrode and a source electrode. The second switch 8 is also an N-type field effect transistor and includes a grid electrode, a drain electrode and a source electrode. The grid electrode of the first switch 7 is connected to the drain electrode of the second switch 8. The drain electrode of the first switch 7 is connected to the main coil a-c of the transformer 6. The source electrode of the first switch 7 is connected to the source electrode of the second switch 8 through a detection resistor 9. The grid electrode of the second switch 8 is connected to the source electrode of the first switch 7 through a thermistor 10. The thermistor 10 is a type of resistor with resistance that varies significantly with temperature.

The LED power circuit also includes linear compensation resistors 20 and 21 configured to limit the increase of the output electrical current of the LED caused by voltage rises of the power grid. One end of the linear compensation resistors 20 and 21 is connected to the rectifying unit 5, and the other end of the linear compensation resistors 20 and 21 is connected to the grid electrode of the second switch 8. Further, the LED power circuit includes a first capacitor 12, a second resistor 13 and a third resistor 14 that are connected between the auxiliary coil d-e of the transformer and the grid electrode of the first switch 7, where the third resistor 14 and the first capacitor 12 are connected in series, and the second resistor 13 and the first capacitor 12 are connected in parallel. In addition, the LED power circuit includes a first resistor 11 that is connected between the rectifying unit 5 and the grid electrode of the first switch 7. The rectified voltage is reduced by the first resistor 11 and applied to the grid electrode of the first switch 7. The LED power circuit also includes a diode 15 and a second capacitor 16 that are connected between the output coil a-b of the transformer and the LED, where the second capacitor 16 and the LED are connected in parallel. The positive pole of the diode 15 is connected to the output coil a-b of the transformer, and the negative pole of the diode 15 is connected to the LED.

The specific powering process of the LED power circuit is described as follows. After AC power is applied, the AC voltage 1 passes through the dimmer 2 and a fuse 3. After filtered by the filtering unit 4 and rectified by the rectifying unit 5, the inputted AC voltage signal is converted to a DC signal. The rectified voltage is reduced by a first resistor 11 and applied to the grid electrode of the first switch 7. When the voltage reaches a threshold voltage of the grid electrode of the first switch 7, the drain electrode and the source electrode of the first switch 7 are turned on (i.e., a conducting state). At this time, an electrical current flows through the main coil a-c of the transformer 6 to the first switch 7 and the detection resistor 9, and the electrical current increases with a linear ratio. According to Faraday's law of electromagnetism induction, voltages are generated on the auxiliary coil d-e of the transformer 6, where the voltage on pin e is positive and the voltage on pin d is negative. The positive voltage on pin e passes through the first capacitor 12, the second resistor 13 and the third resistor 14, so that the voltage on the grid electrode of the first switch 7 keeps increasing. Thus, the conducting impedance is smaller when the electrical current flows through the first switch 7, and the electrical current keeps increasing. At the same time, the electrical current that flows through the detection resistor 9 also increases. The electrical current that flows through the detection resistor 9 can generate a detection voltage. After passing through the thermistor 10, the detection voltage is applied on the grid electrode of the second switch 8. When the electrical current that flows through the main coil a-c of the transformer 6 to the first switch 7 and the detection resistor 9 reaches certain amplitude and the voltage generated on the detection resistor 9 reaches a threshold voltage of the grid electrode of the second switch 8, the drain electrode and the source electrode of the second switch 8 are in an on state (i.e., a conducting state), so that the electrical current that flows through the main coil a-c of the transformer 6 no longer increases. According to Faraday's law of electromagnetism induction, each coil of the transformer 6 generates a counter EMF (electromotive force). Pin e of the transformer 6 generates a negative voltage. The second switch 8 is closed, and the output coil a-b of the transformer 6 charges the second capacitor 16 and supplies electricity for the LED through the diode 15. When energy in the transformer 6 is completely released, each coil of the transformer 6 generates the counter electromotive force again, and the power supply of the LED is maintained by the second capacitor 16. The voltages on auxiliary coil d-e of the transformer 6 reverses. That is, the voltage on pin e is positive and the voltage on pin d is negative. The positive voltage on pin e passes through the first capacitor 12, the second resistor 13 and the third resistor 14, so that the voltage on the grid electrode of the first switch 7 keeps increasing, and the first switch 7 opens again. The LED power circuit repeats the above working process in cycles.

Because the working temperature of the LED lamp is relatively high, the thermistor 10 utilizes a positive temperature coefficient (PTC) resistor to provide a compensation function. When the temperature increases, the threshold voltage of the grid electrode of the second switch 8 decreases, causing that the electrical current flowing through the main coil a-c of the transformer 6 to the first switch 7 decreases, and the output electrical current of the LED also decreases. However, when the temperature increases, the resistance of the thermistor 10 becomes larger, thus the voltage reaching the grid electrode of the second switch 8 decreases. In order to make the voltage reach the threshold voltage of the grid electrode of the second switch 8, the electrical current that flows through the main coil a-c to the first switch 7 needs to be increased, such that the output electrical current of the LED can increase. Therefore, the PTC thermistor 10 is added to compensate the decrease of the output electrical current of the LED caused when the threshold voltage of the grid electrode of the second switch 8 decreases with the increase of the temperature.

Similarly, a resistor 17 can be a negative temperature coexistence (NTC) thermistor, whereas the resistor 10 may be an ordinary resistor. A resistor 18 in the circuit is a voltage dependent resistor and is configured to provide surge protection. The resistor 20 and the resistor 21 are linear compensation resistors and are configured to limit the increase of the output electrical current of the LED caused by voltage rises caused by voltage increases in a power grid.

The dimming process using the dimmer is described as follows. An external dimmer 2 (mainly a phase-cut dimmer) is utilized herein. When performing a dimming control operation, a knob of the dimmer is rotated. When the phase of the dimmer becomes small, the voltage on the capacitor 19 connected in parallel with the rectifying unit also generates low-frequency (approximately 100 HZ or 120 HZ) phase-cut. At the same time, a low-frequency (approximately 100 HZ or 120 HZ) envelope voltage generated on the auxiliary coil d-e of the transformer 6 also generates phase-cut. The low-frequency envelope voltage on the output coil a-b of the transformer 6 also generates phase-cut. Therefore, the output energy becomes small. The second capacitor 16 takes the average of the electrical current that outputs the phase-cut. After generating phase-cut, the average output current of the LED also decreases. When the phase of the dimmer becomes large, the output current of the LED increases.

Figure 2:
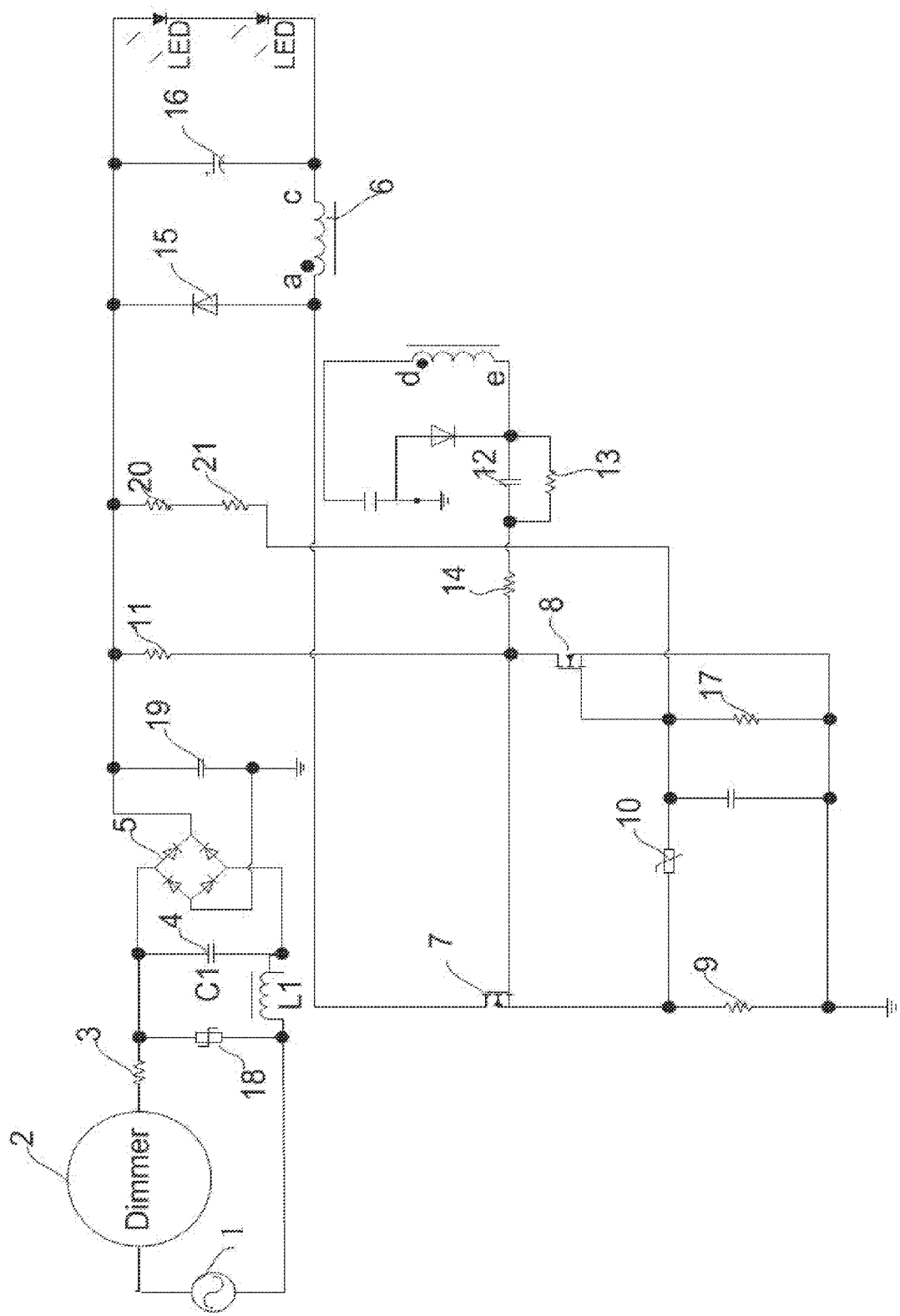
FIG. 2 illustrates a structure diagram of another exemplary LED power circuit consistent with the disclosed embodiments.

FIG. 2 illustrates a structure diagram of another exemplary LED power circuit consistent with the disclosed embodiments. The LED power circuit is a buck circuit herein. As shown in FIG. 2, the LED power circuit can be used to drive an LED lighting device. An AC power supply 1 and a dimmer 2 may be existing structures that are widely used. The LED power circuit may include a filtering unit 4, a rectifying unit 5, a transformer 6, a first switch 7, and a second switch 8.

The transformer 6 includes a main coil a-c that is connected to the first switch 7, and an auxiliary coil d-e that is connected to the second switch 8. The first switch 7 is an N-type field effect transistor and includes a grid electrode, a drain electrode and a source electrode. The second switch 8 is also an N-type field effect transistor and includes a grid electrode, a drain electrode and a source electrode. The grid electrode of the first switch 7 is connected to the drain electrode of the second switch 8. The drain electrode of the first switch 7 is connected to the main coil a-c of the transformer 6. The source electrode of the first switch 7 is connected to the source electrode of the second switch 8 through a detection resistor 9. The grid electrode of the second switch 8 is connected to the source electrode of the first switch 7 through a thermistor 10.

The operating principle of the LED power circuit shown in FIG. 2 is the same as the operating principle of the LED power circuit shown in FIG. 1.

The specific powering process of the LED power circuit is described as follows. When AC power is on, an AC voltage passes through the dimmer 2 and a fuse 3. After filtered by the filtering unit 4 and rectified by the rectifying unit 5, the inputted AC voltage signal is converted to a DC signal. The rectified voltage is reduced by a first resistor 11 and applied to the grid electrode of the first switch 7. When the voltage reaches a threshold voltage of the grid electrode of the first switch 7, the drain electrode and the source electrode of the first switch 7 are in an on state (i.e., a conducting state). At this time, an electrical current flows through the main coil a-c of the transformer 6 to the first switch 7 and the detection resistor 9 and the electrical current increases with a slope. According to Faraday's law of electromagnetism induction, voltages are generated on the auxiliary coil d-e of the transformer 6, where the voltage on pin e is positive and the voltage on pin d is negative.

The positive voltage on pin e passes through a first capacitor 12, a second resistor 13 and a third resistor 14, so that the voltage on the grid electrode of the first switch 7 keeps increasing. Conductor resistance is smaller when the electrical current flows through the first switch 7, and the electrical current keeps increasing. At the same time, the electrical current that flows through the detection resistor 9 also increases. The electrical current that flows through the detection resistor 9 can generate a detection voltage. After passing through the thermistor 10, the detection voltage is applied on the grid electrode of the second switch 8. When the electrical current that flows through the main coil a-c of the transformer 6 to the first switch 7 and the detection resistor 9 reaches certain amplitude and the voltage generated on the detection resistor 9 reaches a threshold voltage of the grid electrode of the second switch 8, the drain electrode and the source electrode of the second switch 8 are in an on state (i.e., a conducting state), so that the electrical current that flows through the main coil a-c of the transformer 6 no longer increases. According to Faraday's law of electromagnetism induction, each coil of the transformer 6 generates counter electromotive force. Pin e of the transformer 6 generates a negative voltage. The second switch 8 is closed, and the output coil a-c of the transformer 6 charges a second capacitor 16 and supplies electricity for the LED through a diode 15. When energy in the transformer 6 is completely released, each coil of the transformer 6 generates the counter electromotive force again, and the power supply of the LED is maintained by the second capacitor 16. The voltages on feedback coil d-e of the transformer 6 reverse. That is, the voltage on pin e is positive and the voltage on pin d is negative. The positive voltage on pin e passes through the first capacitor 12, the second resistor 13 and the third resistor 14, so that the voltage on the grid electrode of the first switch 7 keeps increasing, and the first switch 7 opens again. The LED power circuit repeats the above working process in cycles.

Because the working temperature of the LED lamp is relatively high, the thermistor 10 utilizes a positive temperature coefficient (PTC) resistor to provide a compensation function. When the temperature increases, the threshold voltage of the grid electrode of the second switch 8 decreases, causing that the electrical current flowing through the main coil a-c of the transformer 6 to the first switch 7 decreases, and the output electrical current of the LED also decreases. However, when the temperature increases, the resistance of the thermistor 10 becomes larger, thus the voltage reaching the grid electrode of the second switch 8 decreases. In order to make the voltage reach the threshold voltage of the grid electrode of the second switch 8, the electrical current that flows through the main coil a-c to the first switch 7 needs to be increased, such that the output electrical current of the LED can increase. Therefore, the PTC thermistor 10 is added to compensate the decrease of the output current of the LED caused when the threshold voltage of the grid electrode of the second switch 8 decreases with the increase of the temperature. Similarly, a resistor 17 can be a negative temperature coexistence (NTC) thermistor, whereas the resistor 10 uses an ordinary resistor. A resistor 18 in the circuit is a voltage dependent resistor and is configured to provide surge protection. A resistor 20 and a resistor 21 are linear compensation resistors and are configured to decrease the increase of the output electrical current of the LED caused by voltage rise when the voltage in power grid increases.

The dimming process using the dimmer is described as follows. An external dimmer 2 (mainly a phase-cut dimmer) is utilized herein. When performing a dimming control operation, a knob of the dimmer is rotated. When the phase of the dimmer becomes small, the voltage on the capacitor 19 generates low-frequency (approximately 100 HZ or 120 HZ) phase-cut. At the same time, a low-frequency (approximately 100 HZ or 120 HZ) envelope voltage generated on the coil d-e of the transformer 6 also generates phase-cut. The low-frequency envelope voltage on the output coil a-c of the transformer 6 also generates phase-cut. Therefore, the output energy becomes small. The second capacitor 16 takes the average of the electrical current that outputs the phase-cut. After generating phase-cut, the average output current of the LED also decreases. When the phase of the dimmer becomes large, the output current of the LED becomes bigger.

Note that, the term "comprising", "including" or any other variants thereof are intended to cover a non-exclusive inclusion, such that the process, method, article, or apparatus containing a number of elements also include not only those elements, but also other elements that are not expressly listed; or further include inherent elements of the process, method, article or apparatus. Without further restrictions, the statement "includes a . . . " does not exclude other elements included in the process, method, article, or apparatus having those elements.

The embodiments disclosed herein are exemplary only. Other applications, advantages, alternations, modifications, or equivalents to the disclosed embodiments are obvious to those skilled in the art and are intended to be encompassed within the scope of the present disclosure.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

A power circuit for an LED lighting device using discrete components is provided. The circuit can include a filtering unit and a rectifying unit. After passing through the filtering unit and the rectifying unit, an inputted alternating current is converted to a direct current. The circuit also includes a transformer connected to the rectifying unit, a first switch including a grid electrode, a drain electrode and a source electrode, and a second switch including a grid electrode, a drain electrode and a source electrode. The first switch and the second switch are field effect transistors. The grid electrode of the first switch is connected to the drain electrode of the second switch. The drain electrode of the first switch is connected to the transformer. The source electrode of the first switch is connected to the source electrode of the second switch through a detection resistor. The grid electrode of the second switch is connected to the source electrode of the first switch through a thermistor.

Compared with existing technologies, an LED power circuit consistent with the present disclosure is formed by discrete components without the need of a complicated control circuit. Also, because the switch is a field effect transistor and the device that controls the switch is also a field effect transistor, the temperature drift is small and the output electrical current of the LED is stable. In addition, the LED power circuit can provide a temperature compensation function to remedy the low precision of the discrete components, thereby making the output electrical current more precise. The disclosed LED power circuit can realize a desired dimming function through a dimmer installed on the wall without needing many additional changes over current wirings. Embodiments consistent with the present disclosure thus may decrease the cost of the LED lighting devices.

REFERENCE SIGN LIST

AC power supply 1
Dimmer 2
Fuse 3
Filtering unit 4
Rectifying unit 5
Transformer 6
First switch 7
Second switch 8
Detection resistor 9
Thermistor 10
First resistor 11
First capacitor 12
Second resistor 13
Third resistor 14
Diode 15
Capacitor 16
Resistor 17
Resistor 18
Capacitor 19
Resistor 20
Resistor 21

What is claimed is:

1. A power circuit for a light emitting diode (LED) lighting device using discrete components, comprising:
    a filtering unit configured to filter an inputted alternating current;
    a rectifying unit configured to convert the alternating current to a direct current;
    a transformer connected to the rectifying unit;
    a first switch including a gate electrode, a drain electrode and a source electrode; and
    a second switch including a gate electrode, a drain electrode and a source electrode, wherein:
    the first switch and the second switch are field effect transistors;
    the gate electrode of the first switch is connected to the drain electrode of the second switch;
    the drain electrode of the first switch is connected to the transformer;
    the source electrode of the first switch is connected to the source electrode of the second switch through a detection resistor; and
    the gate electrode of the second switch is connected to the source electrode of the first switch through a thermistor.

2. The circuit according to claim 1, wherein the transformer further includes:
    a main coil connected to the rectifying unit;
    an output coil connected to the LED lighting device; and
    an auxiliary coil connected to the first switch and the second switch.

3. The circuit according to claim 1, wherein the transformer includes:
    the main coil connected to the LED lighting device; and
    the auxiliary coil connected to the first switch and the second switch.

4. The circuit according to claim 1, wherein:
    the first switch and the second switch are N-type field effect transistors.

5. The circuit according to claim 1, wherein:
    the thermistor utilizes a positive temperature coefficient (PTC) resistor to provide a compensation function.

6. The circuit according to claim 1, wherein:
    the thermistor utilizes a negative temperature coefficient (NTC) resistor to provide the compensation function.

7. The circuit according to claim 1, further including:
    a first resistor placed between the rectifying unit and the gate electrode of the first switch, wherein the rectified voltage is reduced by the first resistor and applied to the gate electrode of the first switch.

8. The circuit according to claim 1, further including:
    a voltage dependent resistor configured to provide surge protection.

9. The circuit according to claim 1, further including:
    a linear compensation resistor configured to limit the increase of the output electrical current of the LED caused by a voltage rise related to a voltage increase in a power grid.

10. The circuit according to claim 1, further including:
    a first capacitor, a second resistor and a third resistor placed between the auxiliary coil of the transformer and the gate electrode of the first switch.

11. The circuit according to claim 1, further including:
    a diode and a second capacitor placed between the output coil of the transformer and the LED.

12. The circuit according to claim 1, further including:
    a capacitor connected in parallel with the rectifying unit.

13. A method for configuring a power circuit for an LED lighting device using discrete components, comprising:
   configuring a filtering unit to filter an inputted alternating current;
   connecting a transformer to a rectifying unit, wherein the rectifying unit is configured to convert the alternating current to a direct current; and
   configuring a first switch including a gate electrode, a drain electrode and a source electrode and a second switch including a gate electrode, a drain electrode and a source electrode, wherein:
   the first switch and the second switch are field effect transistors;
   the gate electrode of the first switch is connected to the drain electrode of the second switch;
   the drain electrode of the first switch is connected to the transformer;
   the source electrode of the first switch is connected to the source electrode of the second switch through a detection resistor; and
   the gate electrode of the second switch is connected to the source electrode of the first switch through a thermistor.

14. The method according to claim 13, further including:
   connecting a main coil of the transformer to the rectifying unit;
   connecting an output coil of the transformer to the LED lighting device; and
   connecting an auxiliary coil of the transformer to the first switch and the second switch.

15. The method according to claim 13, further including:
   connecting the main coil of the transformer to the LED lighting device; and
   connecting the auxiliary coil of the transformer to the first switch and the second switch.

16. The method according to claim 13, wherein:
   the first switch and the second switch are N-type field effect transistors.

17. The method according to claim 13, further including:
   placing a first resistor between the rectifying unit and the gate electrode of the first switch, wherein the rectified voltage is reduced by the first resistor and applied to the gate electrode of the first switch.

18. The method according to claim 13, further including:
   placing a first capacitor, a second resistor and a third resistor between the auxiliary coil of the transformer and the gate electrode of the first switch.

19. The method according to claim 13, further including:
   placing a diode and a second capacitor between the output coil of the transformer and the LED.

20. The method according to claim 13, further including:
   connecting a capacitor in parallel with the rectifying unit.

* * * * *